US012569921B2

(12) United States Patent
Wollenburg et al.

(10) Patent No.: US 12,569,921 B2
(45) Date of Patent: Mar. 10, 2026

(54) T-SLOT ROUTER BIT

(71) Applicant: Woodpeckers, LLC, Strongsville, OH (US)

(72) Inventors: Benjamin T. Wollenburg, North Olmsted, OH (US); Hanna Geiger, Olmsted Falls, OH (US)

(73) Assignee: Woodpeckers, LLC, Strongsville, OH (US)

( * ) Notice: Subject to any disclaimer, the term of this patent is extended or adjusted under 35 U.S.C. 154(b) by 344 days.

(21) Appl. No.: 18/302,915

(22) Filed: Apr. 19, 2023

(65) Prior Publication Data

US 2024/0351119 A1 Oct. 24, 2024

(51) Int. Cl.
| | |
|---|---|
| *B23C 5/10* | (2006.01) |
| *B27G 13/00* | (2006.01) |

(52) U.S. Cl.
CPC .......... *B23C 5/1054* (2013.01); *B27G 13/002* (2013.01); *B23C 2210/54* (2013.01); *B23C 2230/04* (2013.01)

(58) Field of Classification Search
CPC ...... B27G 13/002; B27G 13/12; B27G 13/14; B27G 15/00; B27C 5/02; B23C 5/10; B23C 5/12; B23C 5/1054; B23C 2210/40; B23C 2210/54; B23C 2230/04; B23C 2265/08; Y10T 407/1948; B27F 1/02
USPC ........................................................ D15/139
See application file for complete search history.

(56) References Cited

U.S. PATENT DOCUMENTS

| | | | |
|---|---|---|---|
| 3,597,817 | A | 8/1971 | Whalley |
| D273,387 | S | 4/1984 | Lassiter |
| D273,390 | S | 4/1984 | Lassiter |
| D273,391 | S | 4/1984 | Lassiter |
| D536,095 | S | 1/2007 | May |
| D665,431 | S | 8/2012 | Pan et al. |
| D671,155 | S | 11/2012 | Defougeres |
| D724,126 | S | 3/2015 | Senn |
| D823,089 | S | 7/2018 | Shikama |
| D937,913 | S | 12/2021 | Wang |
| D958,856 | S | 7/2022 | Kim et al. |
| D967,208 | S | 10/2022 | Kang et al. |
| 2004/0156689 | A1 | 8/2004 | Shen |

(Continued)

FOREIGN PATENT DOCUMENTS

WO WO-2024014008 A1 * 1/2024

OTHER PUBLICATIONS https://www.homedepot.com/p/POWERTEC-5-8-in-Dia-x-3-16-in-H-X-1-2-in-Shank-Carbide-Tipped-T-Slot-Router-Bit-73025/319903199 (Year: 2024).

(Continued)

*Primary Examiner* — Jared O Brown

(74) *Attorney, Agent, or Firm* — Sand, Sebolt & Wernow Co., LPA

(57) ABSTRACT

A T-slot router bit for simultaneously cutting a T-slot groove into a work piece and withdrawing pieces of cut work piece from the T-slot groove in a single pass. The T-slot router bit includes a shank end, a boring end opposite to the shank end, a shank that extends from the shank end and is adapted to engage with a chuck of a router, a body that extends from the shank to the boring end and defines a T-shaped configuration, a pair of helical flutes of the body that extends between the shank and the boring end, and a pair of cutting edges that extends between the shank and the boring end.

18 Claims, 8 Drawing Sheets

(56) References Cited

U.S. PATENT DOCUMENTS

| | | | |
|---|---|---|---|
| 2008/0170917 A1* | 7/2008 | Hilker | B23C 5/1054 |
| | | | 407/54 |
| 2008/0193234 A1* | 8/2008 | Davancens | B23B 35/00 |
| | | | 408/144 |
| 2014/0290798 A1 | 10/2014 | Hilker | |
| 2014/0341661 A1* | 11/2014 | Lin | B23C 5/10 |
| | | | 407/53 |
| 2015/0298225 A1 | 10/2015 | Ueno et al. | |
| 2016/0263664 A1 | 9/2016 | Son et al. | |
| 2024/0351238 A1 | 10/2024 | Wollenburg et al. | |

OTHER PUBLICATIONS https://www.woodpeck.com/ultra-shear-solid-carbide-spiral-router-bits.html (Year: 2025).

* cited by examiner

T-SLOT ROUTER BIT

TECHNICAL FIELD

This disclosure is directed to cutting bits, more particularly T-slot router cutting bits.

BACKGROUND ART

T-tracks, T-slot grooves, and keyhole grooves are commonly used in various woodworking projects. Generally, these types of tracks and grooves provide woodworkers with the ease of engaging various types of clamps, guides, stops, or other various woodworking tools that include T-shaped bolts, T-shaped knobs, T-shaped nuts to engage with these tracks and grooves. With such engagement, woodworkers may quickly install and secure these woodworking tools along T-tracks and T-slot grooves for precisely locking various types of work piece with a woodworking tool or work table. However, commercially available T-tracks and devices having T-slot grooves are rather expensive based on the types of material used to manufacture these devices. In most instances, these commercially available T-tracks and devices having T-slot grooves are made from aluminum or welded steel, which, while are strong and durable tools, are expensive for beginner woodworkers and/or novice woodworkers.

To combat this issue, woodworkers may create or a build a do-it-yourself (hereinafter "DIY") T-track for a cheaper alternative by cutting various T-tracks or T-slot grooves into a wood work piece. However, while such DIY T-tracks are suitable, woodworkers must purchase and own multiple router bits and/or cutting bits in order to cut T-tracks or T-slot grooves into a wood work piece. With such router bits, woodworkers must then perform multiple steps to a T-slot groove into the wood work piece by utilizing multiple router bits. Woodworkers may also perform subsequent steps in sanding and/or smoothening surfaces the top surface of the wood work piece due to the rough and/or sharp edges left by these router bits. Woodworkers may also perform subsequent steps in smoothening the base walls and/or surfaces inside of the T-slot grooves due to the rough and/or sharp surfaces left by these router bits. As such, these DIY T-Track alternatives still require woodworkers to have access to multiple router bits and require the expenditure of more time and effort when the woodworker is cutting one or more T-tracks or T-slots into a work piece.

SUMMARY OF THE INVENTION

In one aspect, an exemplary embodiment of the present disclosure may provide a T-slot router bit. The T-slot router bit includes a shank end, a boring end opposite to the shank end, a shank that extends from the shank end and is adapted to engage with a chuck of a router, a body that extends from the shank to the boring end and defines a T-shaped configuration, a pair of helical flutes of the body that extends between the shank and the boring end, and a pair of cutting edges that extends between the shank and the boring end. The body is configured to simultaneously cut a T-slot groove into a work piece and withdrawn pieces of cut work piece from the T-slot groove in a single pass.

This exemplary embodiment or another exemplary embodiment may further include that the body comprises: a base portion extending from the shank; a reamer portion extending from the base portion and configured to cut a first portion of the T-slot groove; and a tip portion extending from the reamer portion to the boring end and configured to cut a second portion of the T-slot groove vertically below the first portion of the of the T-slot groove. This exemplary embodiment or another exemplary embodiment may further include that the tip portion comprises: a first end positioned proximate to the reamer portion; a second end positioned opposite to the first end at the boring end; and at least one vertical cutting edge extending longitudinally from the first end to the second end; wherein the at least one vertical cutting edge is configured to cut a pair of first vertical walls defining the T-slot groove in the work piece. This exemplary embodiment or another exemplary embodiment may further include that the tip portion further comprises: a pair of tip vertical lands; and at least one helical tip flute defined between the pair of tip lands; wherein the at least one helical tip flute defines a first portion of the at least one helical flute of the body. This exemplary embodiment or another exemplary embodiment may further include that the tip portion further comprises: a web; and at least one horizontal cutting edge extending radially outward from the web to the at least one vertical cutting edge; wherein the at least one horizontal cutting edge is configured to cut a base wall defining the T-slot groove in the work piece; wherein the base wall is positioned vertically below the pair of first vertical walls. This exemplary embodiment or another exemplary embodiment may further include that the tip portion further comprises a notch defined in the at least one horizontal cutting edge; wherein the notch extends from the at least one vertical cutting edge towards the web. This exemplary embodiment or another exemplary embodiment may further include that the tip portion further comprises: at least one horizontal trailing edge; and at least one flank extending between the at least one horizontal cutting edge and the at least one horizontal trailing edge; wherein the at least one flank enables the pieces of cut work piece to flow from the at least one horizontal cutting edge to the at least one horizontal trailing edge. This exemplary embodiment or another exemplary embodiment may further include that the reamer portion comprises: a first end positioned proximate to the base portion; a second end opposite to the first end and positioned proximate to the tip portion; and at least one chamfered cutting edge extending from the first end to a medial point defined between the first end and the second end; wherein the at least one chamfered cutting edge is configured to cut a pair of top chamfered walls defining the T-slot groove. This exemplary embodiment or another exemplary embodiment may further include at least one planar cutting edge extending from the at least one chamfered cutting edge to the tip portion; wherein the at least one planar cutting edge is configured to cut a pair of second vertical walls defining the T-slot groove; wherein the pair of second vertical walls is defined between the pair of top chamfered walls and the pair of first vertical walls. This exemplary embodiment or another exemplary embodiment may further include that the reamer portion further comprises: a pair of reamer lands; and at least one helical reamer flute defined between the pair of reamer lands; wherein the at least one helical reamer flute defines a second portion of the at least one helical flute of the body. This exemplary embodiment or another exemplary embodiment may further include that the reamer portion further comprises: a first angle of the at least one chamfered cutting edge measured relative to a drill axis defined between the shank end and the boring end; and a second angle of the at least one planar cutting edge measured relative to the drill axis; wherein the second helix angle is greater than the first helix angle. This exemplary embodiment or another exemplary embodiment may further include that the base portion comprises: a pair of base lands; and at least one helical base flute defined between the pair of base lands; wherein the at least one helical base flute defines a third portion of the at least one helical flute of the body. This exemplary embodiment or another exemplary embodiment may further include that a first bit length defined by the base portion; a second bit length defined by the reamer portion; and a third bit length defined by the tip portion; wherein the third bit length is less than each of the first bit length and the second bit length. This exemplary embodiment or another exemplary embodiment may further include that the at least one helical flute of the body is oriented in an up-cut configuration.

In another aspect, and exemplary embodiment of the present disclosure may provide a method of cutting a T-slot groove into a work piece in a single pass. The method comprises steps of: engaging a shank of the T-slot router bit with a router; introducing the T-slot router bit and the router to the work piece; aligning a body of the T-slot router bit with a side wall of the work piece, wherein the body defines a T-shape configuration; and cutting the T-slot groove into the work piece, via the body of the T-slot router bit, in the single pass.

This exemplary embodiment or another exemplary embodiment may further include a step of withdrawing pieces of cut work piece from the T-slot groove, via a pair of helical flutes defined in the body, in the single pass. This exemplary embodiment or another exemplary embodiment may further include that the step of cutting the T-slot groove into the work piece further comprises: cutting a pair of top walls of the T-slot groove, via at least one chamfered cutting edge of a reamer portion of the body, in the single pass; wherein the pair of top walls is chamfered relative to a top surface of the work piece. This exemplary embodiment or another exemplary embodiment may further include that the step of cutting the T-slot groove into the work piece further comprises: cutting a pair of first vertical walls of the T-slot groove, via at least one planar cutting edge of the reamer portion of the body, in the single pass; wherein the pair of first vertical walls are substantially perpendicular to the top surface of the work piece and vertically below the pair of top walls. This exemplary embodiment or another exemplary embodiment may further include that the step of cutting the T-slot groove into the work piece further comprises: cutting a pair of second vertical walls of the T-slot groove, via at least one vertical cutting edge of a tip portion of the body, in the single pass; wherein the pair of second vertical walls are substantially perpendicular to the top surface of the work piece and vertically below the pair of first vertical walls. This exemplary embodiment or another exemplary embodiment may further include that the step of cutting the T-slot groove into the work piece further comprises: cutting a base wall of the T-slot groove, via at least one horizontal cutting edge of the tip portion of the body, in the single pass; wherein the pair of base wall is substantially parallel to the top surface of the work piece and vertically below the pair of second vertical walls.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 2:
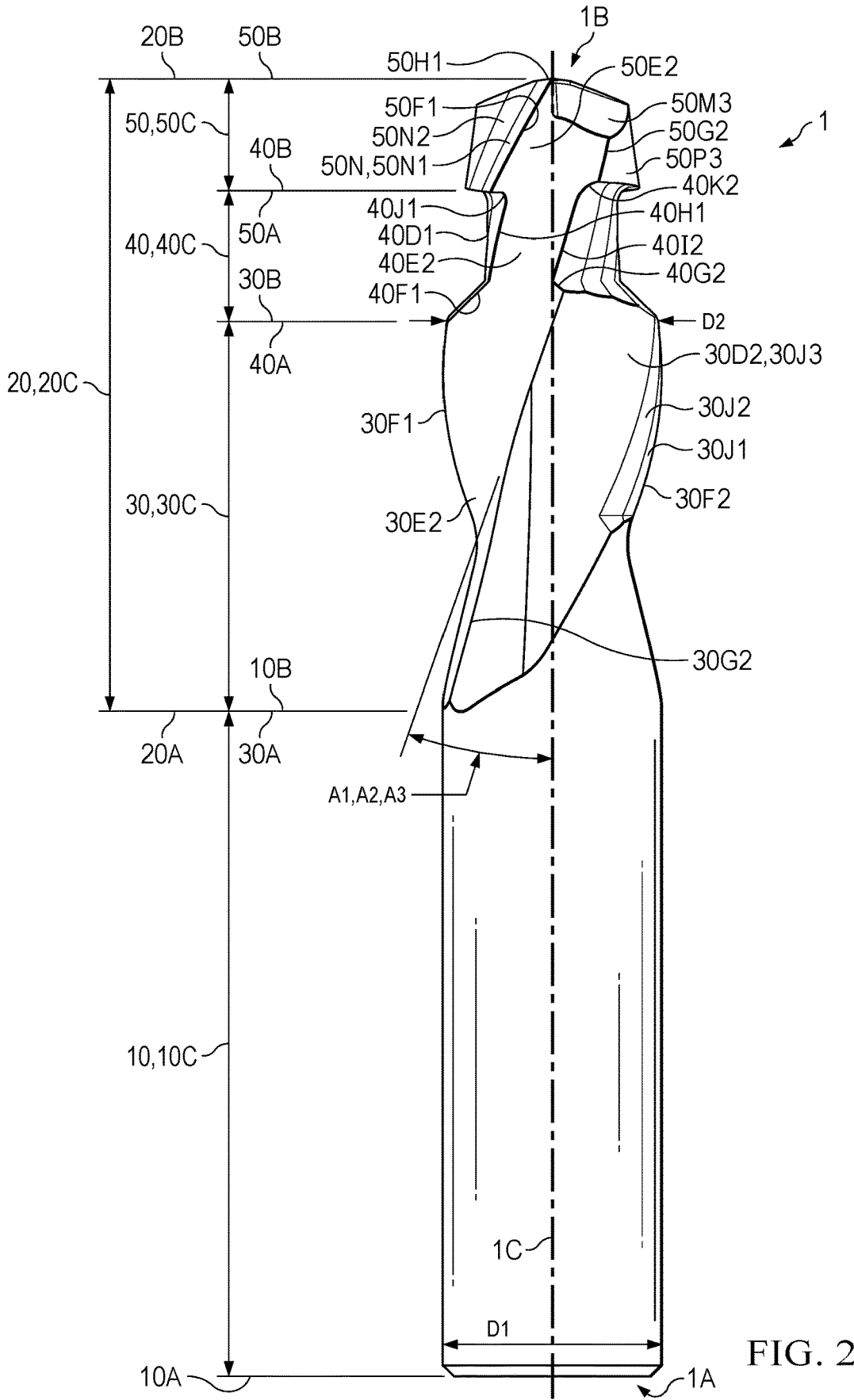
FIG. 2 is a front elevation view of the T-slot router bit shown in FIG. 1.
Figure 3:
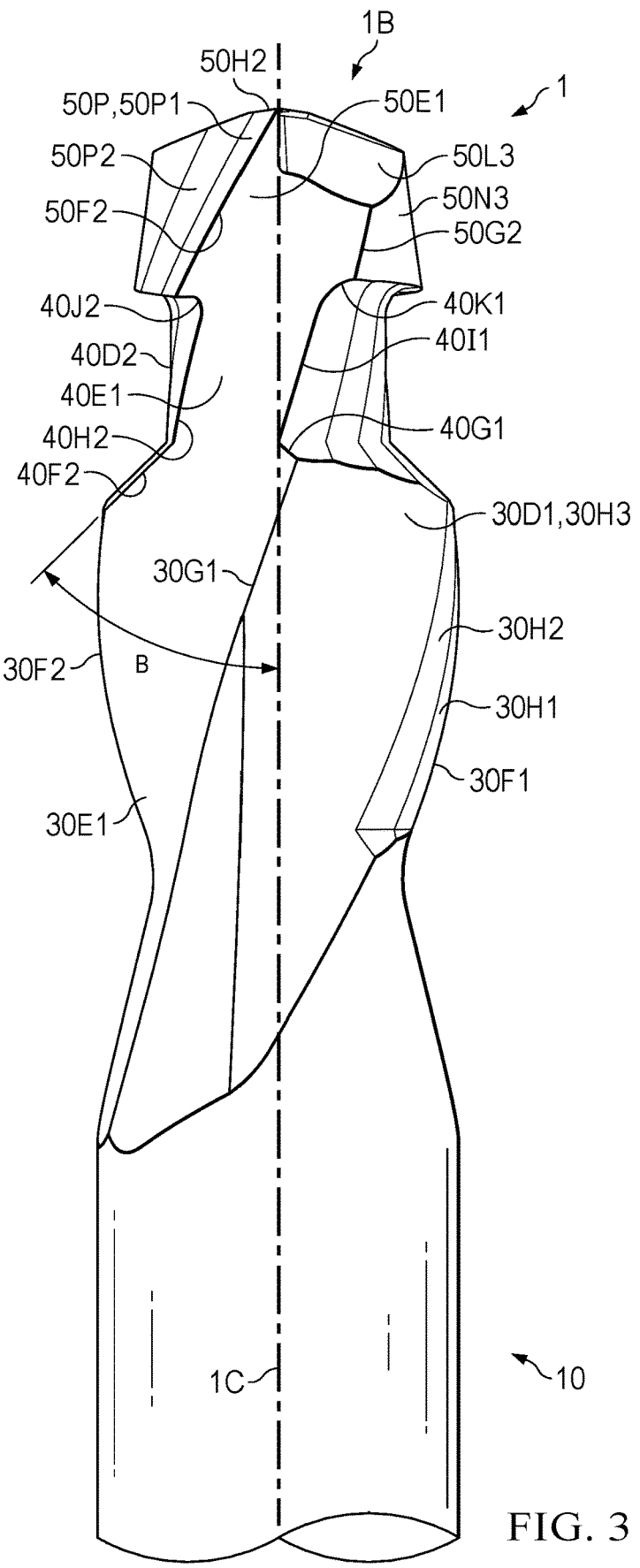
FIG. 3 is a partial rear elevation view of the T-slot router bit shown in FIG. 1.
Figure 4:
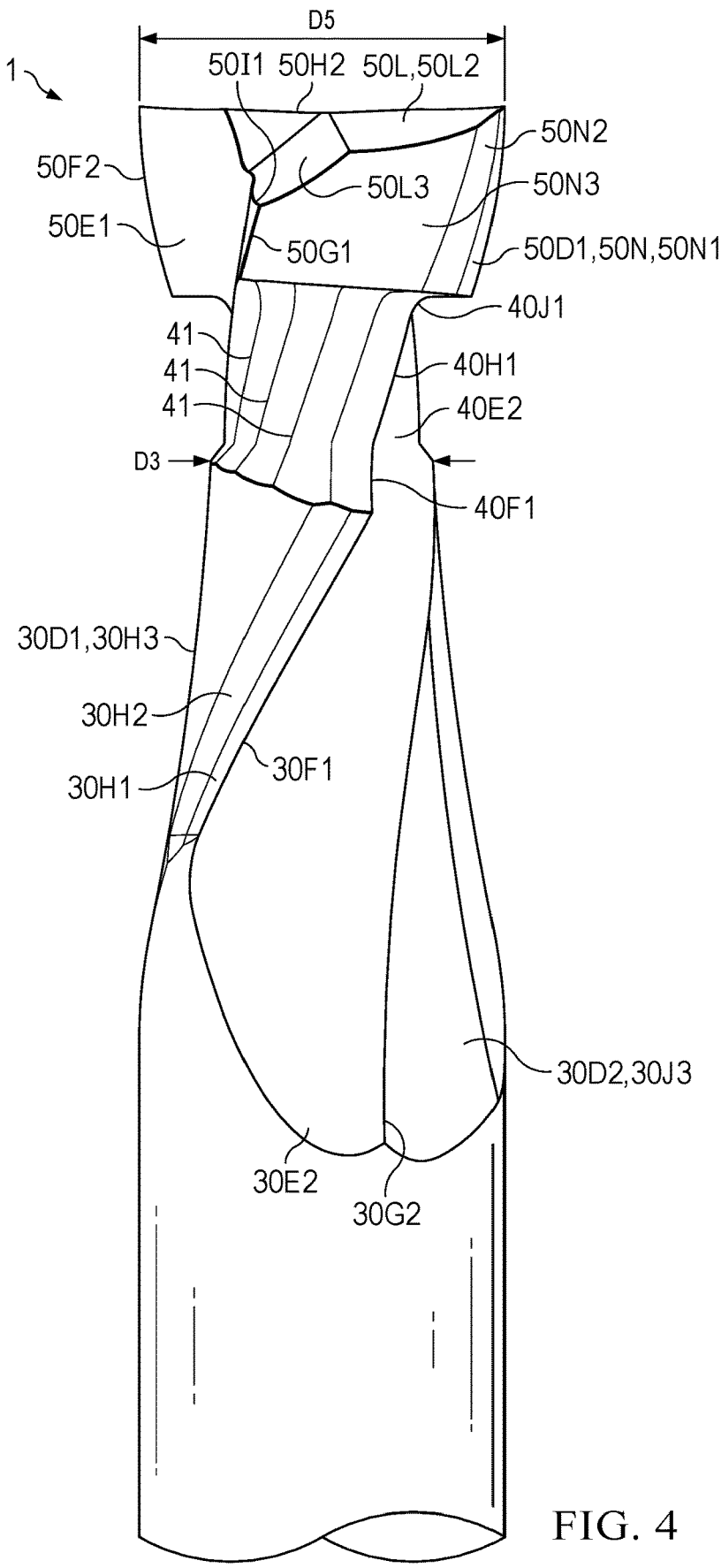
FIG. 4 is a partial first side elevation view of the T-slot router bit shown in FIG. 1.
Figure 5:
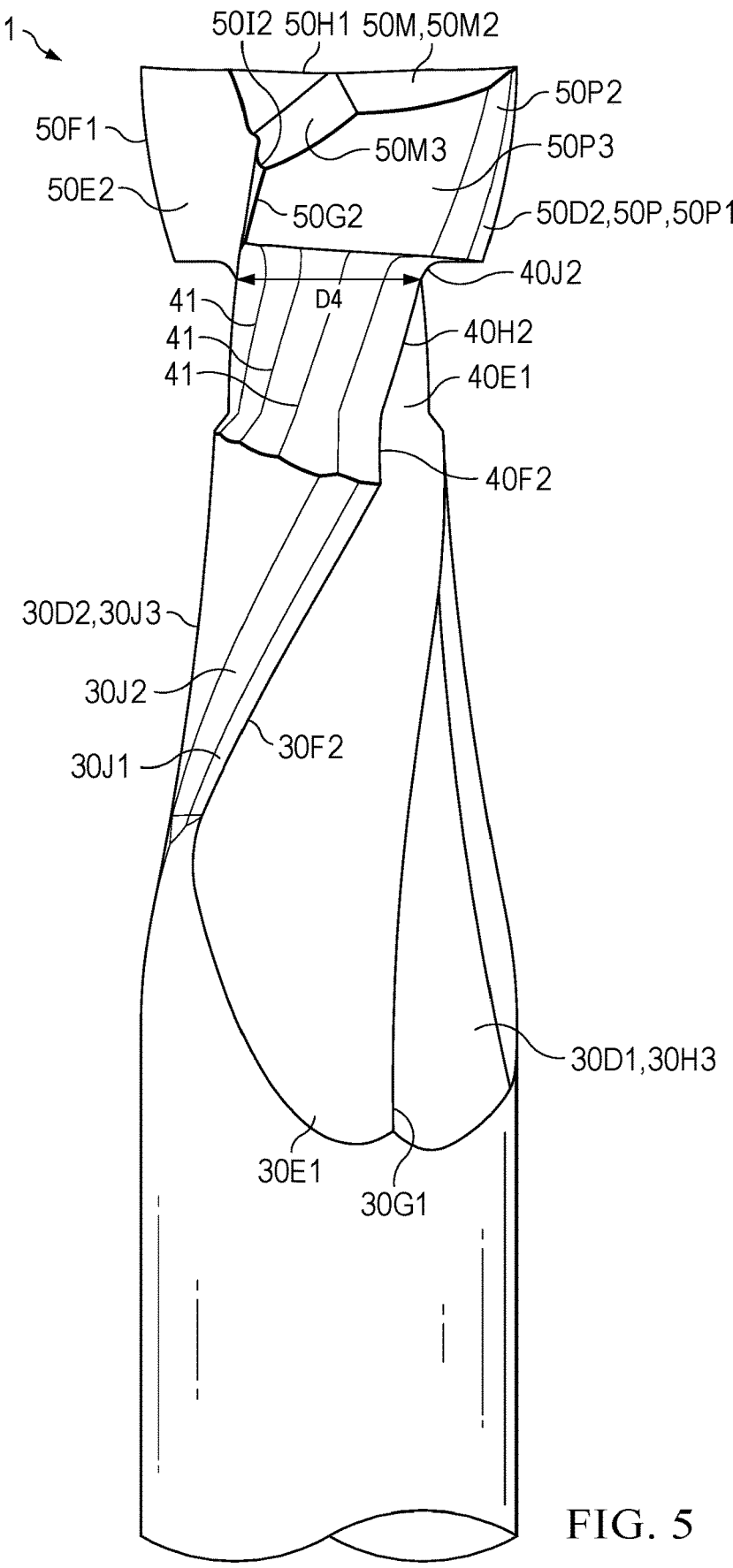
FIG. 5 is a partial first side elevation view of the T-slot router bit shown in FIG. 1.

FIGS. 1-8 illustrate a T-slot router bit (hereinafter "router bit") that is generally referred to as 1. Router bit 1 includes a first end or shank end 1A, a second end or boring end 1B longitudinally opposite to the shank end 1A, and a drill axis 1C defined therebetween (see FIGS. 1-2). As best seen in FIGS. 4-5, router bit 1 defines a T-shape profile or configuration for cutting one or more T-slot grooves into a work piece. As discussed in greater detail below, router bit 1 is configured to operably engage with a portable router or cutting device for cutting a T-slot groove into a work piece in a single pass without preparing the work piece prior to a cutting operation and without marring or burning the work piece during a cutting operation. Such components and features of router bit 1 is discussed in greater detail below.

Figure 7:
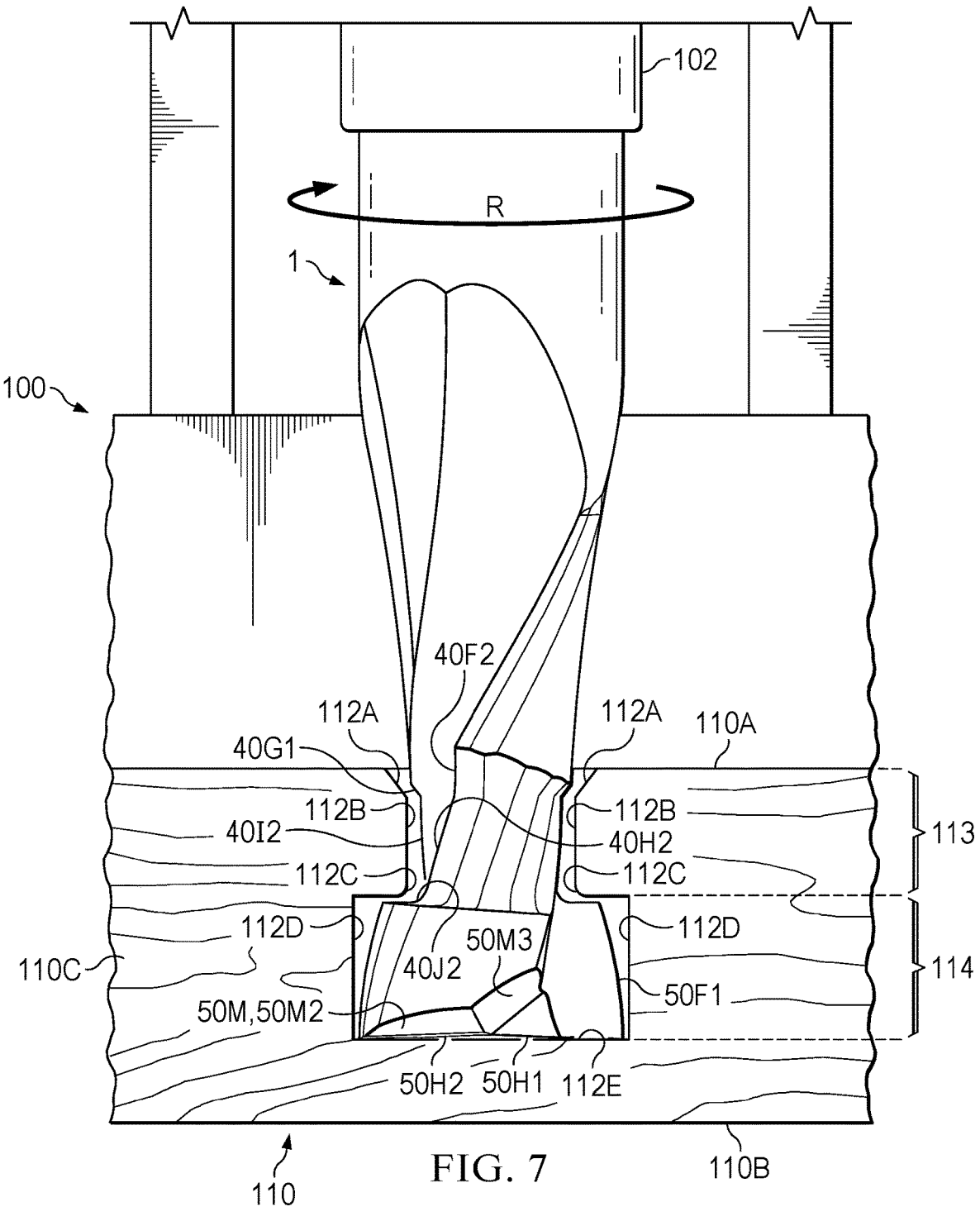
FIG. 7 is an operational view of the T-slot router bit cutting a T-slot groove into a work piece in a single pass, wherein the T-slot router bit is operably engaged with a portable router.

Router bit 1 includes a shank 10. As best seen in FIGS. 2-3, shank 10 includes a first end 10A positioned at the shank end 1A, a second end 10B longitudinally opposite to the first end 10A and remote from the shank end 1A, and a shank or first bit length 10C measured from the first end 10A to the second end 10B. Referring to FIG. 2, shank 10 also defines a first bit diameter D1 that is continuous along the entire length of the shank 10. In the present disclosure, first bit diameter D1 of shank 10 is of about one-half inch. In other exemplary embodiments, first bit diameter D1 of shank 10 may be any suitable diameter dictated by the implementation of router bit 1 being used with other portable routers or cutting devices. As best seen in FIG. 7, shank 10 enables a portable router or cutting device to operably engage with router bit 1 for cutting one or more T-slot grooves into a work piece.

In the present disclosure, shank 10 defines a smooth, continuous outer surface extending along the entire length of shank 10. It should be appreciated that shank 10 of router bit 1 may include other features and/or components for enabling a portable router or cutting device to operably engage with router bit 1 to reduce drill slipping and/or to provide a strong chuck grip. In one exemplary embodiment, a shank of a router bit discussed herein may have a three-flat shank design to reduce drill slipping and/or to provide a strong chuck grip. In another exemplary embodiment, a shank of a router bit discussed herein may have a reduce shank design to reduce drill slipping and/or to provide a strong chuck grip. In another exemplary embodiment, a shank of a router bit discussed herein may have a tang shank design to reduce drill slipping and/or to provide a strong chuck grip.

Figure 1:
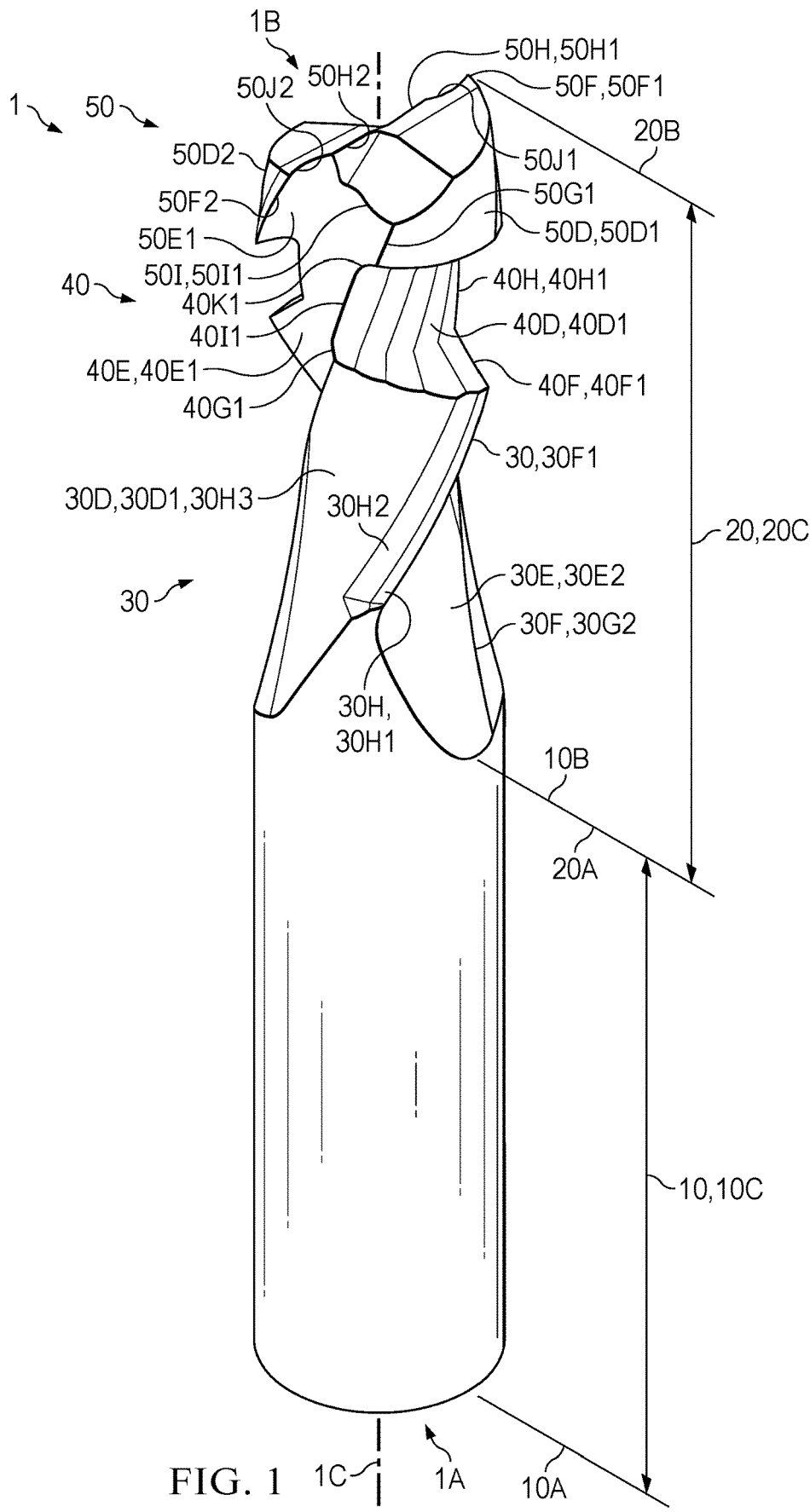
FIG. 1 is a front, top, first side isometric perspective view of a T-slot router bit in accordance with one aspect of the present disclosure.

Router bit 1 also includes a body 20 that operably engages with shank 10. As best seen in FIG. 1, body 20 includes a first end 20A that operably engages with the second end 10B of shank 10, a second end 20B longitudinally opposite to the first end 20A and positioned at the boring end 1B, and a second bit length 20C measured between the first end 20A and the second end 20B. In the present disclosure, the second bit length 20C of body 20 is less than the first bit length 10C of shank 10. In one exemplary embodiment, the second bit length 20C of body 20 may be greater than the first bit length 10C of shank 10. In another exemplary embodiment, the second bit length 20C of body 20 may be equal with the first bit length 10C of shank 10.

It should be understood that shank 10 and body 20 form a continuous, monolithic component which inevitably forms router bit 1. As described in greater detail below, body 20 also includes one or more portions for cutting a T-slot groove in a work piece in a single pass along the work piece. Such portions of the body 20 used for cutting a T-slot groove in a work piece in a single pass are described in greater details below.

Body 20 includes a first or base portion 30. As best seen in FIG. 2, base portion 30 includes a first end 30A proximate to the first end 20A of body 20, a second end 30B longitudinally opposite to the first end 30A and remote from the first end 20A of body 20, and a third bit length 30C defined therebetween. In the present disclosure, the third bit length 30C of base portion 30 is a part of the second bit length 20C of body 20.

In the present disclosure, base portion 30 includes at least one base land 30D that extends longitudinally between the first end 30A and the second end 30B and defines at least one base flute 30E. As best seen in FIGS. 4-5, base portion 30 includes a pair of base lands 30D that extends longitudinally between the first end 30A and the second end 30B and defines a pair of base flutes 30E. In the present disclosure, each base flute of the pair of base flutes 30E is defined in a helically and/or spirally profile in the pair of base lands 30D. As such, each base flute of the pair of base flutes 30E is helically and/or spirally wound about the drill axis 1C of router bit 1. During operation, each flute of the pair of base flutes 30E may enable pieces of cut work piece to be evacuated and/or withdrawn from the work piece as router bit 1 cuts a T-slot groove into the work piece.

As best seen in FIG. 2, each base flute of the pair of base flutes 30E is defined at a first helix angle "A1" measured relative to the drill axis 1C. In the present disclosure, each base flute of the pair of base flutes 30E is defined at a helix angle of about thirty degrees measured relative to the drill axis 1C.

In the present disclosure, each base flute of the pair of base flutes 30E is also defined in an up-cut or up-cut spiral profile. The up-cut profile of the pair of base flutes 30E enables router bit 1 to evacuate and/or withdraw cut pieces of work piece from the T-slot groove during a cutting operation. Such evacuation and/or cleaning of cut pieces of work piece from the T-slot groove prevents marring or damage to the finish of the T-slot groove, chatter, or damage to the router bit 1. In one exemplary embodiment, each base flute of the pair of base flutes 30E may be defined in a down-cut or down-cut spiral profile. In another exemplary embodiment, each base flute of the pair of base flutes 30E may be defined in a linear and/or planar profile that runs parallel with the drill axis 1C.

While the present disclosure of router bit 1 includes the pair of base lands 30D defining a pair of base flutes 30E, any suitable number of base lands defining a suitable number of base flutes may be provided with a router bit discussed herein. Examples of a suitable number of base lands defining a suitable number of base flutes include at least one, two, a plurality, three, four, five, and any other suitable number of base lands defining a suitable number of base flutes in a router bit.

Base portion 30 also includes at least one leading edge or lip 30F extending along each base land of the set of base lands 30D. As best seen in FIGS. 4-5, a first leading edge 30F1 is defined along a first base land 30D1 of the pair of base lands 30D and extends from the first end 30A to the second end 30B. Similarly, a second leading edge 30F2 is also defined along a second base land 30D2 of the pair of base lands 30D and extends from the first end 30A to the second end 30B. During a cutting operation, each of the first leading edge 30F1 and the second leading edge 30F2 may be positioned above a top surface of a work piece and external to a T-slot groove.

Base portion 30 also includes at least one trailing edge or end 30G extending along each base land of the set of base lands 30D. As best seen in FIG. 3, a first trailing edge 30G1 is defined along the first base land 30D1 of the pair of base lands 30D and extends from the first end 30A to the second end 30B. In the present disclosure, the first trailing edge 30G1 is positioned behind the first leading edge 30F1 relative to the first base land 30D1. Similarly, a second trailing edge 30G2 is defined along the second base land 30D2 of the pair of base lands 30D and extends from the first end 30A to the second end 30B. In the present disclosure, the second trailing edge 30G2 is also positioned behind the second leading edge 30F2 relative to the second base land 30D2.

It should be understood that the pair of leading edges 30F and the pair of trailing edges 30G define the limits of the pair of base flutes 30E. As best seen in FIGS. 2 and 4, the first leading edge 30F1 and the second trailing edge 30G2 defines the limits of a first base flute 30E1 of the pair of base flutes 30E. Similarly, and as best seen in FIGS. 3-5, the second leading edge 30F2 and the first trailing edge 30G1 defines the limits of a second base flute 30E2 of the pair of base flutes 30E.

In the present disclosure, each base land of the pair of base lands 30D may define a set of first grooves 30H between the pair of flutes 30E. As best seen in FIG. 3, the first base land 30D1 may define a first groove 30H1 of a set of first grooves 30H that is positioned between the first leading edge 30F1 and the first trailing edge 30G1 proximate to the first leading edge 30F1. The first base land 30D1 may also define a second groove 30H2 of the set of first grooves 30H that is positioned between the first groove 30H1 and the first trailing edge 30G1 and is adjacent to the first groove 30H1. The first base land 30D1 may also define a third groove 30H3 of the set of first grooves 30H that is positioned between the second groove 30H2 and the first trailing edge 30G1. As best seen in FIG. 2, the third groove 30H3 defined in the first base land 30D1 includes a surface area that is greater than surface areas of the first groove 30H1 and the second groove 30H2.

Similarly, as best seen in FIG. 3, the second base land 30D2 may also define a first groove 30J1 of a set of second grooves 30J that is positioned between the second leading edge 30F2 and the second trailing edge 30G2 proximate to the second leading edge 30F2. The second base land 30D2 may also define a second groove 30J2 of the set of second grooves 30J that is positioned between the first groove 30J1 and the second trailing edge 30G2 and is adjacent to the first groove 30J1. The second base land 30D2 may also define a third groove 30J3 of the set of second grooves 30J that is positioned between the second groove 30J2 and the second trailing edge 30G2. As best seen in FIG. 3, the third groove 30J3 defined in the second base land 30D2 includes a surface area that is greater than surface areas of the first groove 30J1 and the second groove 30J2.

Base portion 30 also defines a second bit diameter D2 that is continuous along the entire length of the base portion 30 (see FIG. 2). In the present disclosure, second bit diameter D2 of base portion 30 is measured between the first leading edge 30F1 of the first base land 30D1 and the second leading edge 30F2 of the second base land 30D2. As such, the second bit diameter D2 of base portion 30 is equal with the first bit diameter D1 of the shank 10. In the present disclosure, second bit diameter D2 of base portion 30 is of about one-half inch. In other exemplary embodiments, second bit diameter D2 of base portion 30 may be any suitable diameter dictated by the implementation of router bit 1 being used with other routers or cutting devices.

Body 20 also includes a second or reamer portion 40 that operably engages with the base portion 30. As best seen in FIG. 2, reamer portion 40 includes a first end 40A that operably engages with the second end 30B of base portion 30, a second end 40B longitudinally opposite to the first end 40A and remote from the base portion 30, and a fourth bit length 40C measured between the first end 40A and the second end 40B. In the present disclosure, the fourth bit length 40C of the reamer portion 40 is less than the third bit length 30C of the base portion 30. As discussed in greater detail below, the reamer portion 40 is configured to cut a first or upper portion of a T-slot groove in a work piece in a single pass.

In the present disclosure, reamer portion 40 includes at least one reamer land 40D that extends longitudinally between the first end 40A and the second end 40B and defines at least one reamer flute 40E. As best seen in FIGS. 2-3, reamer portion 40 includes a pair of reamer lands 40D that extends longitudinally between the first end 40A and the second end 40B and defines a pair of reamer flutes 40E. In the present disclosure, each reamer flute of the pair of reamer flutes 40E is defined in a helically and/or spirally profile in the pair of reamer lands 40D. As such, each reamer flute of the pair of reamer flutes 40E is helically and/or spirally wound about the drill axis 1C of router bit 1. During operation, each flute of the pair of reamer flutes 40E may enable pieces of cut work piece to be evacuated and/or withdrawn from the work piece as router bit 1 cuts a T-slot groove into the work piece.

In the present disclosure, each reamer flute of the pair of reamer flutes 40E is also aligned with a respective base flute of the pair of base flutes 30E. As best seen in FIG. 2, a first reamer flute 40E1 of the pair of reamer flutes 40E is aligned with the first base flute 30E1 of the pair of base flutes 30E. Similarly, as best seen in FIG. 3, a second reamer flute 40E2 of the pair of reamer flutes 40E is aligned with the second base flute 30E2 of the pair of base flutes 30E.

As best seen in FIG. 2, each reamer flute of the pair of reamer flutes 40E is also defined at a second helix angle "A2" measured relative to the drill axis 1C, which is equal with the first helix angle "A1" of each base flute of the pair of base flutes 30E. In the present disclosure, each reamer flute of the pair of reamer flutes 40E is defined at a helix angle of about thirty degrees measured relative to the drill axis 1C.

In the present disclosure, each reamer flute of the pair of reamer flutes 40E is also defined in an up-cut or up-cut spiral profile. The up-cut profile of the pair of reamer flutes 40E enables router bit 1 to evacuate and/or withdraw cut pieces of work piece from the T-slot groove during a cutting operation. Such evacuation and/or cleaning of cut pieces of work piece from the T-slot groove prevents marring or damage to the finish of the T-slot groove, chatter, or damage to the router bit 1. In one exemplary embodiment, each reamer flute of the pair of reamer flutes 40E may be defined in a down-cut or down-cut spiral profile. In another exemplary embodiment, each reamer flute of the pair of reamer flutes 40E may be defined in a linear and/or planar profile that runs parallel with the drill axis 1C.

While the present disclosure of router bit 1 includes the pair of reamer lands 40D defining a pair of reamer flutes 40E, any suitable number of reamer lands defining a suitable number of reamer flutes may be provided with a router bit discussed herein. Examples of a suitable number of reamer lands defining a suitable number of reamer flutes include at least one, two, a plurality, three, four, five, and any other suitable number of reamer lands defining a suitable number of reamer flutes in a router bit.

Reamer portion 40 also includes at least one chamfered cutting edge or lip 40F extending along each reamer land of the set of reamer lands 40D. As best seen in FIGS. 2-4, a first chamfered cutting edge 40F1 is defined along a first reamer land 40D1 of the pair of reamer lands 40D and extends from the first end 40A towards the second end 40B. Similarly, a second chamfered cutting edge 40F2 is also defined along a second reamer land 40D2 of the pair of reamer lands 40D and extends from the first end 40A towards the second end 40B. During a cutting operation, each of the first chamfered cutting edge 40F1 and the second chamfered cutting edge 40F2 contacts and cuts the work piece to create a chamfered and/or beveled pair of top walls or surfaces of a T-slot groove, which is discussed in greater detail below. Such creation of chamfered and/or beveled pair of top walls or surfaces by the first chamfered cutting edge 40F1 and the second chamfered cutting edge 40F2 removes steps of sanding and/or smoothening the work piece subsequent to cutting one or more T-slot grooves into a work piece. As such, the first chamfered cutting edge 40F1 and the second chamfered cutting edge 40F2 leave clean, smooth chamfered and/or beveled edges along the top surfaces of the T-slot grooves.

Each of the first chamfered cutting edge 40F1 and the second chamfered cutting edge 40F2 is defined at an angle "B" measured relative to the drill axis 1C (see FIG. 3). In the present disclosure, each of the first chamfered cutting edge 40F1 and the second chamfered cutting edge 40F2 is defined at an acute angle measured relative to the drill axis 1C.

Reamer portion 40 also includes at least one chamfered trailing edge or end 40G extending along each reamer land of the set of reamer lands 40D. As best seen in FIG. 3, a first chamfered trailing edge 40G1 is defined along the first reamer land 40D1 of the pair of reamer lands 40D and extends from the first end 40A towards the second end 40B. In the present disclosure, the first chamfered trailing edge 40G1 is positioned behind the first chamfered cutting edge 40F1 relative to the first reamer land 40D1. Similarly, and as best seen in FIG. 2, a second chamfered trailing edge 40G2 is defined along the second reamer land 40D2 of the pair of reamer lands 40D and extends from the first end 40A towards the second end 40B. In the present disclosure, the second chamfered trailing edge 40G2 is also positioned behind the second chamfered cutting edge 40F2 relative to the second reamer land 40D2.

Reamer portion 40 also includes at least one planar cutting edge or lip 40H extending along each reamer land of the set of reamer lands 40D. As best seen in FIGS. 2-4, a first planar cutting edge 40H1 is defined along the first reamer land 40D1 of the pair of reamer lands 40D and extends from the first chamfered cutting edge 40F1 towards the second end 40B. In the present disclosure, the first planar cutting edge 40H1 is also positioned vertically above the first chamfered cutting edge 40F1 when viewed from a front elevation view or first side elevation view (see FIGS. 2 and 4). Similarly, a second planar cutting edge 40H2 is also defined along the second reamer land 40D2 of the pair of reamer lands 40D and extends from the second chamfered cutting edge 40F2 towards the second end 40B. In the present disclosure, the second planar cutting edge 40H2 is also positioned vertically above the second chamfered cutting edge 40F2 when viewed from a rear elevation view or second side elevation view (see FIGS. 3 and 5). During a cutting operation, each of the first planar cutting edge 40H1 and the second planar cutting edge 40H2 contacts and cuts the work piece to create a planar and/or straight pair of first vertical walls or surfaces of a T-slot groove vertically below the pair of top surfaces cut by the first chamfered cutting edge 40F1 and the second chamfered cutting edge 40F2.

Reamer portion 40 also includes at least one planar trailing edge or end 40I extending along each reamer land of the set of reamer lands 40D. As best seen in FIG. 3, a first planar trailing edge 40I1 is defined along the first reamer land 40D1 of the pair of reamer lands 40D and extends from the first chamfered trailing edge 40G1 towards the second end 40B. In the present disclosure, the first planar trailing edge 40I1 is positioned behind the first planar cutting edge 40H1 relative to the first reamer land 40D1. In the present disclosure, the first planar trailing edge 40I1 is also positioned vertically above the first chamfered trailing edge 40G1 when viewed from a rear elevation view or second side elevation view (see FIGS. 3 and 5). Similarly, and as best seen in FIG. 2, a second planar trailing edge 40I2 is defined along the second reamer land 40D2 of the pair of reamer lands 40D and extends from the second chamfered trailing edge 40G2 towards the second end 40B. In the present disclosure, the second planar trailing edge 40I2 is also positioned behind the second planar cutting edge 40H2 relative to the second reamer land 40D2. In the present disclosure, the second planar trailing edge 40I2 is also positioned vertically above the second chamfered trailing edge 40G2 when viewed from a front elevation view or first side elevation view (see FIGS. 2 and 4).

Reamer portion 40 also includes at least one rounded cutting edge or lip 40J extending along each reamer land of the set of reamer lands 40D. As best seen in FIG. 2, a first rounded cutting edge 40J1 is defined along the first reamer land 40D1 of the pair of reamer lands 40D and extends from the first planar cutting edge 40H1 to the second end 40B. In the present disclosure, the first rounded cutting edge 40J1 is positioned vertically above the first planar cutting edge 40H1 when viewed from a front elevation view of a first side elevation view (see FIGS. 2 and 4). Similarly, as best seen in FIG. 3, a second rounded cutting edge 40J2 is also defined along the second reamer land 40D2 of the pair of reamer lands 40D and extends from the second planar cutting edge 40H2 to the second end 40B. In the present disclosure, the second rounded cutting edge 40J2 is positioned vertically above the second planar cutting edge 40H2 when viewed from a rear elevation view of a second side elevation view (see FIGS. 3 and 5). During a cutting operation, each of the first rounded cutting edge 40J1 and the second rounded cutting edge 40J2 contacts and cuts the work piece to create a rounded pair of shoulders of a T-slot groove.

Reamer portion 40 also includes at least one trailing rounded edge or end 40K extending along each reamer land of the set of reamer lands 40D. As best seen in FIG. 3, a first rounded trailing edge 40K1 is defined along the first reamer land 40D1 of the pair of reamer lands 40D and extends from the first planar trailing edge 40I1 to the second end 40B. In the present disclosure, the first rounded trailing edge 40K1 is positioned behind the first rounded cutting edge 40J1 relative to the first reamer land 40D1. In the present disclosure, the first rounded trailing edge 40K1 is also positioned vertically above the first planar trailing edge 40I1 when viewed from a rear elevation view of a second side elevation view (see FIGS. 3 and 5). Similarly, as best seen in FIG. 2, a second rounded trailing edge 40K2 is defined along the second reamer land 40D2 of the pair of reamer lands 40D and extends from the second planar trailing edge 40I2 to the second end 40B. In the present disclosure, the second rounded trailing edge 40K2 is also positioned behind the second rounded cutting edge 40J2 relative to the second reamer land 40D2. In the present disclosure, the second rounded trailing edge 40K2 is also positioned vertically above the second planar trailing edge 40I2 when viewed from a front elevation view of a first side elevation view (see FIGS. 2 and 4).

It should be understood that the pair of chamfered cutting edges 40F, the pair of chamfered trailing edges 40G, the pair of planar cutting edges 40H, the pair of planar trailing edges 40I, the pair of rounded cutting edges 40J, and the pair of rounded trailing edges 40K define the limits of the pair of base flutes 30E. As best seen in FIGS. 2 and 4, the first chamfered cutting edge 40F1, the second chamfered trailing edge 40G2, the first planar cutting edge 40H1, the second planar trailing edge 40I2, the first rounded cutting edge 40J1, and the second rounded trailing edge 40K2 define the limits of a first reamer flute 40E1 of the pair of reamer flutes 40E. Similarly, and as best seen in FIGS. 3-5, the second chamfered cutting edge 40F2, the first chamfered trailing edge 40G1, the second planar cutting edge 40H2, the first planar trailing edge 40I1, the second rounded cutting edge 40J2, and the first rounded trailing edge 40K1 define the limits of a second reamer flute 40E2 of the pair of reamer flutes 40E.

In the present disclosure, reamer portion 40 defines a third bit diameter D3 that is measured at the first end 40A between the first chamfered cutting edge 40F1 of the first reamer land 40D1 and the second chamfered cutting edge 40F2 of the second reamer land 40D2 (see FIG. 4). Reamer portion 40 also defines a fourth bit diameter D4 that is measured between the first planar cutting edge 40H1 of the first reamer land 40D1 and the second planar cutting edge 40H2 of the second reamer land 40D2 at a medial location between the first end 40A and the second end 40B (see FIG. 4). The fourth bit diameter D4 is also measured between the first planar cutting edge 40H1 of the first reamer land 40D1 and the second planar cutting edge 40H2 of the second reamer land 40D2. In the present disclosure, the third bit diameter D3 is greater than the fourth bit diameter D4 based on the chamfered and/or beveled design of the first chamfered cutting edge 40F1 and the second chamfered cutting edge 40F2.

With respect to reamer portion 40, lines 41 are shown in the present figures extending longitudinally between the first end 40A of reamer portion 40 and second end 40B of reamer portion. It should be understood that line 41 are diagrammatic only to show the profile and/or contours of the reamer portion 40 of router bit 1 when viewed from either a front elevation view, a rear elevation view, and/or a side elevation view. As such, lines 41 should not be construed as being part of reamer portion 40 of router bit 1.

Body 20 also includes a second or tip portion 50 that operably engages with the reamer portion 40. As best seen in FIGS. 2-3, tip portion 50 includes a first end 50A that operably engages with the second end 40B of reamer portion 40, a second end 50B longitudinally opposite to the first end 50A and positioned at the boring end 1B, and a fifth bit length 50C measured between the first end 50A and the second end 50B. In the present disclosure, the fifth bit length 50C of the tip portion 50 is less than the third bit length 30C of the base portion 30 and greater than the fourth bit length 40C of the reamer portion 40. As discussed in greater detail below, the tip portion 50 is configured to cut a second or lower portion of a T-slot groove in a work piece in a single pass.

In the present disclosure, tip portion 50 includes at least one tip land 50D that extends longitudinally between the first end 50A and the second end 50B and defines at least one tip flute 50E. As best seen in FIGS. 2-3, tip portion 50 includes a pair of tip lands 50D that extends longitudinally between the first end 50A and the second end 50B and defines a pair of tip flutes 50E. In the present disclosure, each tip flute of the pair of tip flutes 50E is defined in a helically and/or spirally profile in the pair of tip lands 50D. As such, each tip flute of the pair of tip flutes 50E is helically and/or spirally wound about the drill axis 1C of router bit 1. During operation, each tip of the pair of tip flutes 50E may enable pieces of cut work piece to be evacuated and/or withdrawn from the work piece as router bit 1 cuts a T-slot groove into the work piece.

In the present disclosure, each tip flute of the pair of tip flutes 50E is also aligned with a respective reamer flute of the pair of reamer flutes 40E. As best seen in FIG. 2, a first tip flute 50E1 of the pair of tip flutes 50E is aligned with the first reamer flute 40E1 of the pair of reamer flutes 40E. Similarly, as best seen in FIG. 3, a second tip flute 50E2 of the pair of tip flutes 50E is aligned with the second reamer flute 40E2 of the pair of reamer flutes 40E.

As best seen in FIG. 2, each tip flute of the pair of tip flutes 50E is defined at a third helix angle "A3" measured relative to the drill axis 1C, which is equal with the first helix angle "A1" of each base flute of the pair of base flutes 30E and the second helix angle "A2" of each reamer flute of the pair of reamer flutes 40E. In the present disclosure, each tip flute of the pair of tip flutes 50E is defined at a helix angle of about thirty degrees measured relative to the drill axis 1C.

In the present disclosure, each tip flute of the pair of tip flutes 50E is also defined in an up-cut or up-cut spiral profile. The up-cut profile of the pair of tip flutes 50E enables router bit 1 to evacuate and/or withdraw cut pieces of work piece from the T-slot groove during a cutting operation. Such evacuation and/or cleaning of cut pieces of work piece from the T-slot groove prevents marring or damage to the finish of the T-slot groove, chatter, or damage to the router bit 1. In one exemplary embodiment, each tip flute of the pair of tip flutes 50E may be defined in a down-cut or down-cut spiral profile. In another exemplary embodiment, each tip flute of the pair of tip flutes 50E may be defined in a linear and/or planar profile that runs parallel with the drill axis 1C.

While the present disclosure of router bit 1 includes the pair of tip lands 50D defining a pair of tip flutes 50E, any suitable number of tip lands defining a suitable number of tip flutes may be provided with a router bit discussed herein. Examples of a suitable number of tip lands defining a suitable number of tip flutes include at least one, two, a plurality, three, four, five, and any other suitable number of tip lands defining a suitable number of tip flutes in a router bit.

Tip portion 50 also includes at least one vertical cutting edge or lip 50F extending along each tip land of the set of tip lands 50D. As best seen in FIG. 2, a first vertical cutting edge 50F1 is defined along a first tip land 50D1 of the pair of tip lands 50D and extends from the first end 50A to the second end 50B. Similarly, a second vertical cutting edge 50F2 is also defined along a second tip land 50D2 of the pair of tip lands 50D and extends from the first end 50A to the second end 50B. During a cutting operation, each of the first vertical cutting edge 50F1 and the second vertical cutting edge 50F2 contacts and cuts the work piece to create a planar and/or straight pair of second vertical walls or surfaces of a T-slot groove.

Tip portion 50 also includes at least one vertical trailing edge or end 50G extending vertically along each tip land of the set of tip lands 50D. As best seen in FIG. 3, a first vertical trailing edge 50G1 is defined along the first tip land 50D1 of the pair of tip lands 50D and extends from the first end 50A to the second end 50B. In the present disclosure, the first vertical trailing edge 50G1 is positioned behind the first vertical cutting edge 50F1 relative to the first tip land 50D1. Similarly, and as best seen in FIG. 2, a second vertical trailing edge 50G2 is defined along the second tip land 50D2 of the pair of tip lands 50D and extends from the first end 50A to the second end 50B. In the present disclosure, the second vertical trailing edge 50G2 is also positioned behind the second vertical cutting edge 50F2 relative to the second tip land 50D2.

Figure 6:
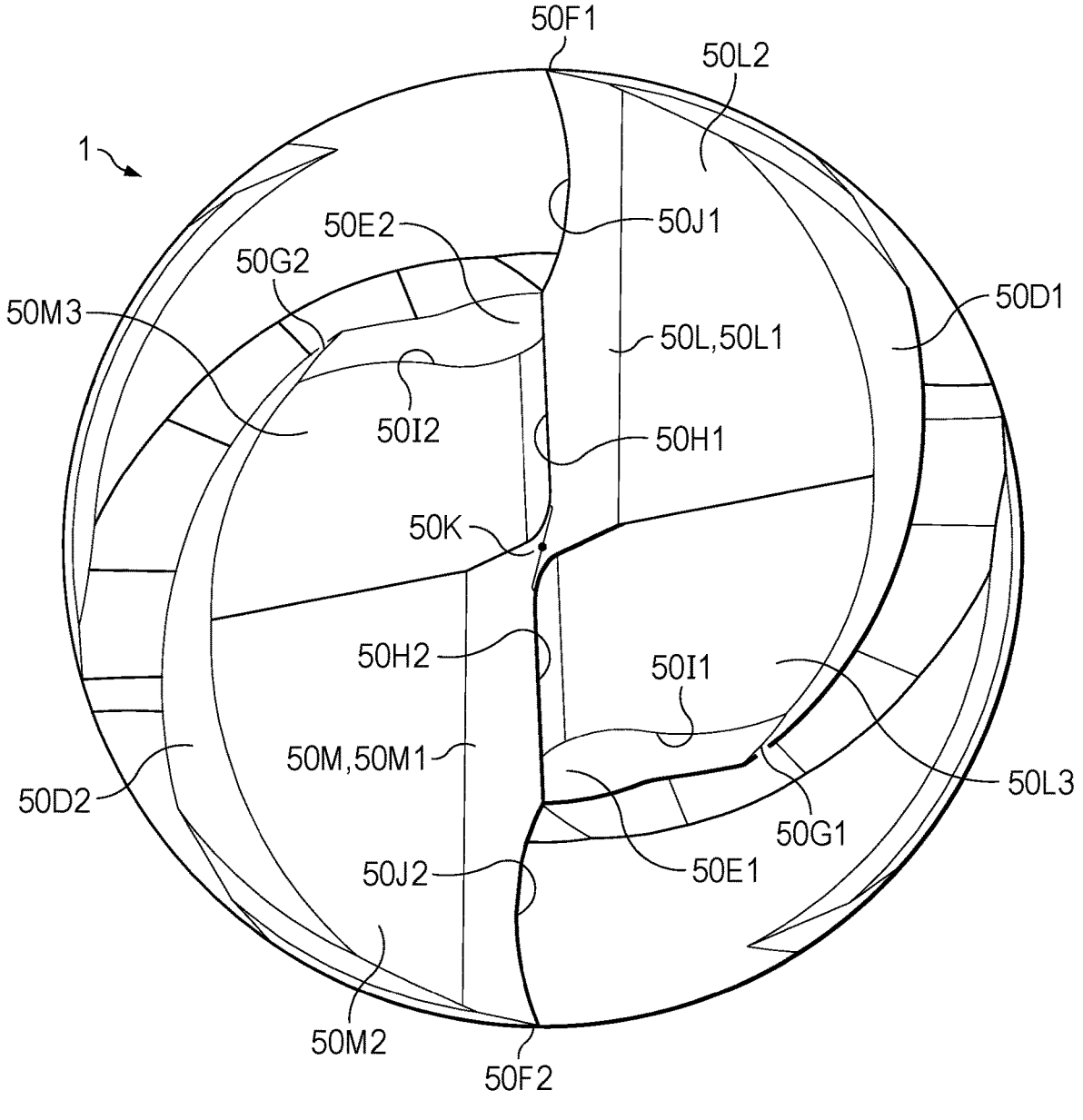
FIG. 6 is a top plan view of the T-slot router bit shown in FIG. 1

Tip portion 50 also includes at least one horizontal cutting edge or lip 50H extending horizontally along each tip land of the set of tip lands 50D. As best seen in FIGS. 1 and 6, a first horizontal cutting edge 50H1 is defined horizontally along the first tip land 50D1 of the pair of tip lands 50D and extends from a web 50K of the tip portion 50 to the first vertical cutting edge 50F1. Similarly, a second horizontal cutting edge 50H2 is also defined horizontally along the second tip land 50D2 of the pair of tip lands 50D and extends from the web 50K to the second vertical cutting edge 50F2. During a cutting operation, each of the first horizontal cutting edge 50H1 and the second horizontal cutting edge 50H2 contacts and cuts the work piece to create a planar and/or straight base wall or surface of a T-slot groove.

Tip portion 50 also includes at least one horizontal trailing edge or end 50I extending horizontally along each tip land of the set of tip lands 50D. As best seen in FIG. 2, a first horizontal trailing edge 50I1 is defined along the first tip land 50D1 of the pair of tip lands 50D and extends horizontally from the web 50K towards a medial point defined between the first vertical cutting edge 50F1 and the first vertical trailing edge 50G1. In the present disclosure, the first horizontal trailing edge 50I1 is positioned behind the first horizontal cutting edge 50H1 relative to the first tip land 50D1. Similarly, and as best seen in FIG. 3, a second horizontal trailing edge 50I2 is defined along the second tip land 50D2 of the pair of tip lands 50D and extends horizontally from the web 50K towards a medial point defined between the second vertical cutting edge 50F2 and the second vertical trailing edge 50G2. In the present disclosure, the second horizontal trailing edge 50I2 is also positioned behind the second horizontal cutting edge 50H2 relative to the second tip land 50D2.

Tip portion 50 also defines at least one notch 50J along one or both of the first horizontal cutting edge 50H1 and the second horizontal cutting edge 50H2. As best seen in FIGS. 1-6, a first notch 50J1 is defined in the first horizontal cutting edge 50H1 and extends horizontally from the first vertical cutting edge 50F1 to a medial location defined between the first vertical cutting edge 50F1 and the web 50K. Similarly, a second notch 50J2 is defined in the second horizontal cutting edge 50H2 and extends horizontally from the second vertical cutting edge 50F2 to a medial location defined between the second vertical cutting edge 50F2 and the web 50K.

Tip portion 50 also includes at least one flank that extends from one or both of the first horizontal cutting edge 50H1 and the second horizontal cutting edge 50H2 to one or both of the first horizontal trailing edge 50I1 and the second horizontal trailing edge 50I2. In the present disclosure, tip portion 50 includes a first flank 50L that extends helically downward from the first horizontal cutting edge 50H1 to the first horizontal trailing edge 50I1. As best seen in FIGS. 4 and 6, the first flank 50L includes a first angled surface 50L1 that extends downwardly from the first horizontal cutting edge 50H1 towards the first horizontal trailing edge 50I1, a second angled surface 50L2 that extends downwardly from the first angled surface 50L1 towards the first horizontal trailing edge 50I1, and a third angled surface 50L3 that extends downwardly from the second angled surface 50L2 to the first horizontal trailing edge 50I1. In the present disclosure, the first flank 50L enables router bit 1 to evacuate and withdraw pieces of cut work piece from the T-slot groove upwardly from the boring end 1B towards the shank end 1A during cutting operations.

In the present disclosure, tip portion 50 also includes a second flank 50M that extends helically downward from the second horizontal cutting edge 50H2 to the second horizontal trailing edge 50I2. As best seen in FIGS. 5-6, the second flank 50M includes a first angled surface 50M1 that extends downwardly from the second horizontal cutting edge 50H2 towards the second horizontal trailing edge 50I2, a second angled surface 50M2 that extends downwardly from the first angled surface 50M1 towards the second horizontal trailing edge 50I2, and a third angled surface 50M3 that extends downwardly from the second angled surface 50M2 to the second horizontal trailing edge 50I2. Similar to the first flank 50L, the second flank 50M also enables router bit 1 to evacuate and withdraw pieces of cut work piece from the T-slot groove upwardly from the boring end 1B towards the shank end 1A during cutting operations.

In the present disclosure, each tip land of the pair of tip lands 50D may define a set of first grooves 50N between the pair of flutes 50E. As best seen in FIGS. 2 and 4, the first tip land 50D1 may define a first groove 50N1 of a set of first grooves 50N that is positioned proximate to the first vertical cutting edge 50F1. The first tip land 50D1 may also define a second groove 50N2 of the set of first grooves 50N that is positioned between the first groove 50N1 and the first vertical trailing edge 50G1. The first tip land 50D1 may also define a third groove 50N3 of the set of first grooves 50N that is positioned between the second groove 50N2 and the first vertical trailing edge 50G1. As best seen in FIG. 3, the third groove 50N3 defined in the first tip land 50D1 includes a surface area that is greater than surface areas of the first groove 50N1 and the second groove 50N2.

Similarly, as best seen in FIGS. 3 and 5, the second tip land 50D2 may define a first groove 50P1 of a set of second grooves 50P that is positioned proximate to the second vertical cutting edge 50F2. The second tip land 50D2 may also define a second groove 50P2 of the set of second grooves 50P that is positioned between the first groove 50P1 and the second vertical trailing edge 50G2. The second tip land 50D2 may also define a third groove 50P3 of the set of second grooves 50P that is positioned between the second groove 50P2 and the second vertical trailing edge 50G2. As best seen in FIG. 3, the third groove 50P3 defined in the second tip land 50D2 includes a surface area that is greater than surface areas of the first groove 50P1 and the second groove 50P2.

Tip portion 50 also defines a fifth bit diameter D5 that is continuous along the entire length of the tip portion 50. As best seen in FIG. 4, fifth bit diameter D5 of tip portion 50 is measured between the first vertical cutting edge 50F1 of the first tip land 50D1 and the second vertical cutting edge 50F2 of the second tip land 50D2. In the present disclosure, fifth bit diameter D5 of tip portion 50 is greater than the fourth bit diameter D4. In other exemplary embodiments, fifth bit diameter D5 of tip portion 50 may be any suitable diameter dictated by the implementation of router bit 1 being used with other routers or cutting devices.

It should be understood that the base portion 30, the reamer portion 40, and the tip portion 50 collectively form the body 20 of router bit 1. As such, the base portion 30, the reamer portion 40, and the tip portion 50 are cut from a single, monthly material to collectively form the body 20 of router bit 1. In one example, router bit 1 discussed herein may be formed from solid carbide. In another example, router bit 1 may be formed from any suitable compound or material that is capable of cutting one or most T-slot grooves into various types of work piece (including various types of wood) in a single pass.

Having now described the components and features of router bit 1, a method of cutting at least one T-slot groove into a work piece with router bit 1 is described in greater detail below.

Prior to performing a cutting operation, a woodworker may install router bit 1 with a portable router 100 or similar cutting device. In the present disclosure, woodworker operably engages the shank 10 of router bit 1 with a chuck 102 of portable router 100 (see FIG. 7). This particular use of router bit 1 is most desirable when cutting at least one T-slot groove into a work piece. It should be appreciated, however, that woodworker may install router bit 1 in other exemplary router devices or cutting devices for cutting one or more T-slot grooves into a work piece. In one example, wood-worker may install router bit 1 in a router table (see FIG. 8) for cutting a T-slot groove into a work piece.

Once router bit 1 is engaged with the portable router 100, the woodworker may then collectively introduce the router bit 1 and the portable router 100 to a work piece 110. Initially, woodworker may place the portable router 100 along a top surface 110A of work piece 110 while the router bit 1 is positioned adjacent to a side wall 110C of work piece 110 that extends between the top surface 110A and a bottom surface 110B of work piece 110. Once router bit 1 and portable router 100 are collectively aligned at a desired position on work piece 110, woodworker may then initiate the portable router 100 to a power ON state to begin rotating the router bit 1 and to begin the cutting operation.

It should be noted that the woodworker is free from prepping and/or preparing the work piece 110 prior to cutting one or more T-slot grooves into work piece 110 with router bit 1. Based on the profile of router bit 1 discussed above, router bit 1 is operable to cut directly into work piece 110 without any pilot holes and/or guide holes that are pre-cut into work piece 110. As such, router bit 1 is operable to directly cut into the top surface 110A of work piece 110 and into the side wall 110C of work piece 110 to cut one or more T-slot grooves without any pilot holes and/or guide holes that are pre-cut into work piece 110. Such profile of router bit 1 removes conventional steps of prepping and/or preparing a work piece with conventional and commercially-available router bits and prevents marring or burning a work piece with conventional and commercially available router bits. As such, the profile of router bit 1 saves the woodworker time and effort when cutting one or more T-slot grooves into work piece 110 as well as preventing the woodworker from marring or burning the work piece 110 during cutting operations.

As the woodworker cuts into work piece 110 with router bit 1, router bit 1 cuts a T-slot groove 112 into work piece 110 in a single pass along work piece 110. As best seen in FIG. 7, body 20 of router bit 1 cuts a pair of top chamfered walls or surfaces 112A, via the reamer portion 40, in the work piece 110 that extends downwardly from the top surface 110A towards the bottom surface 110B at a chamfered angle. Particularly, the first chamfered cutting edge 40F1 and the second chamfered cutting edge 40F2 of the reamer portion 40 cuts the pair of top chamfered walls 112A in the work piece 110 that extends downwardly from the top surface 110A towards the bottom surface 110B at a chamfered angle.

Figure 8:
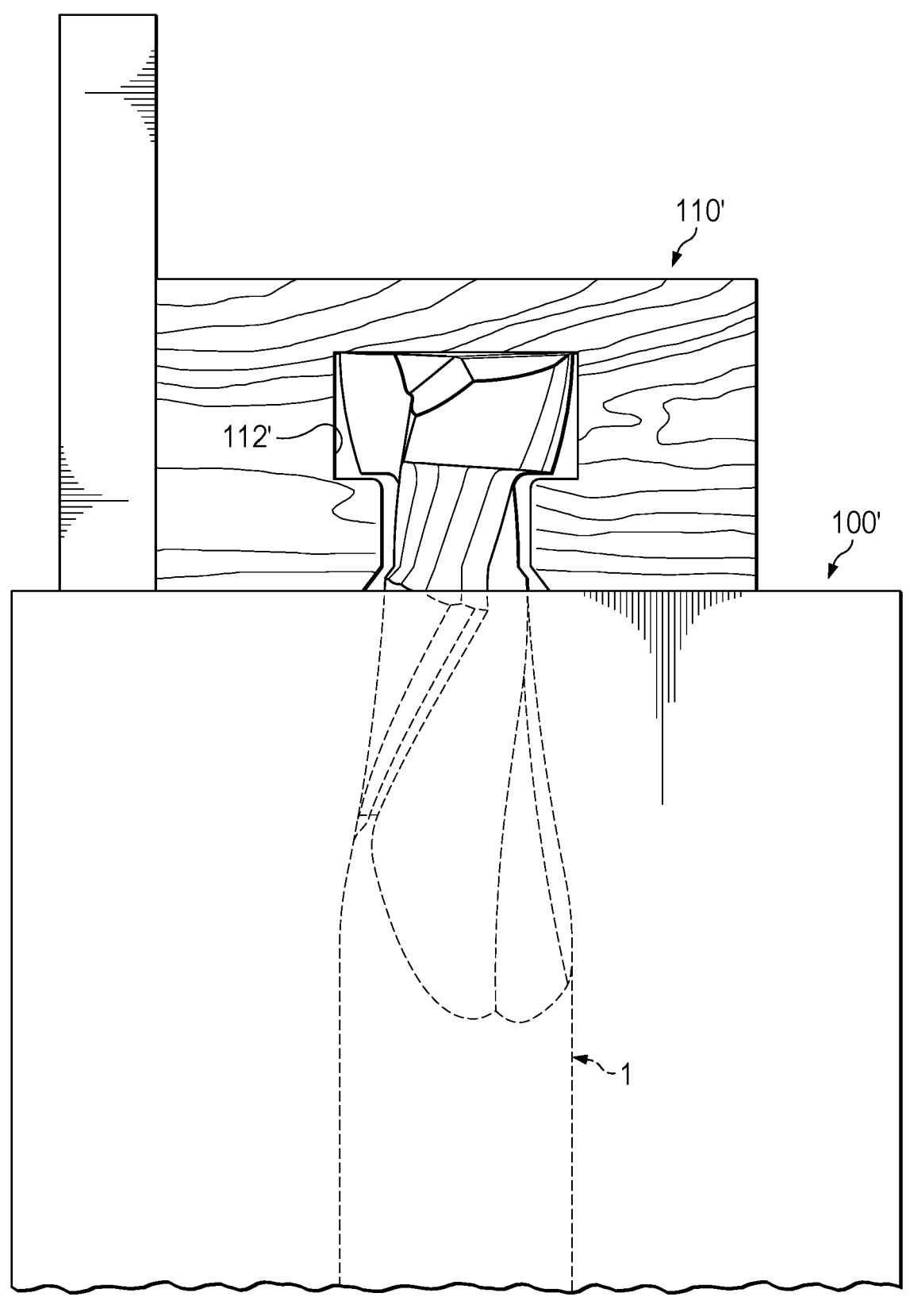
FIG. 8 is another operational view of the T-slot router bit cutting a T-slot groove into a work piece in a single pass, wherein the T-slot router bit is operably engaged with a router table.

Still referring to FIG. 8, body 20 of router bit 1 also cuts a pair of first or upper vertical walls or surfaces 112B, via the reamer portion 40, in the work piece 110. As best seen in FIG. 7, the pair of first vertical walls 112B extends downwardly from the pair of top chamfered walls 112A towards the bottom surface 110B at an angle that is substantially perpendicular to the top surface 110A. More particularly, the first planar cutting edge 40H1 and the second planar cutting edge 40H2 of the reamer portion 40 cuts the pair of first vertical walls 112B in the work piece 110 that extends downwardly from the pair of top chamfered walls 112A towards the bottom surface 110B at an angle that is substantially perpendicular to the top surface 110A.

It should be understood that the pair of top chamfered walls 112A and the pair of first vertical walls 112B define a first or upper portion 113 of T-slot groove 112. As such, reamer portion 40 of body 20 is configured to cut the first portion 113 of T-slot groove 112 in a single pass without being guided by a pilot hole or guide hole pre-cut into the work piece 110. Moreover, the top surface 110A of the work piece 110 cut by the router bit 1 is free from being sanded and/or cleaned by the woodworker subsequent to the T-slot groove 112 being cut into the work piece 110 since the first chamfered cutting edge 40F1 and the second chamfered cutting edge 40F2 of the reamer portion 40 cut the pair of top chamfered walls 112A. Such profile of the reamer portion 40 thus saves the woodworker time in finishing the work piece 110 as well as being free from using or owning additional woodworking finishing tools.

In the same cutting operation, body 20 of router bit 1 also cuts a pair of rounded shoulders 112C, via the reamer portion 40, in the work piece 110. As best seen in FIG. 7, the pair of rounded shoulders 112C extends horizontally away from the pair of first vertical walls 112B at an angle that is substantially parallel with the top surface 110A. More particularly, the first rounded cutting edge 40J1 and the second rounded cutting edge 40J2 of the reamer portion 40 cut the pair of rounded shoulders 112C into the work piece 110 that extends horizontally away from the pair of first vertical walls 112B at an angle that is substantially parallel with the top surface 110A.

In the same cutting operation, body 20 of router bit 1 also cuts a pair of second or lower vertical walls or surfaces 112D, via the tip portion 50, in the work piece 110. As best seen in FIG. 7, the pair of second vertical walls 112D extends downwardly from the pair of rounded shoulders 112C towards the bottom surface 110B at an angle that is substantially perpendicular to the top surface 110A. Particularly, the first vertical cutting edge 50F1 and the second vertical cutting edge 50F2 of the tip portion 50 cut the pair of second vertical walls 112D in the work piece 110 that extends downwardly from the pair of rounded shoulders 112C towards the bottom surface 110B at an angle that is substantially perpendicular to the top surface 110A.

In the same cutting operation, body 20 of router bit 1 also cuts a base wall or surface 112E, via the tip portion 50, in the work piece 110. As best seen in FIG. 7, the base wall 112E extends horizontally inward from the pair of second vertical walls 112D at an angle that is substantially parallel to the top surface 110A. As best seen in FIG. 8, the first horizontal cutting edge 50H1 and the second horizontal cutting edge 50H2 of the tip portion 50 cut the base wall 112E in the work piece 110 that extends horizontally inward from the pair of second vertical walls 112D at an angle that is substantially parallel to the top surface 110A.

It should be understood that the pair of rounded shoulders 112C, the pair of second vertical walls 112D, and the base wall 112E collectively define a second or lower portion 114 of T-slot groove 112. As such, tip portion 50 of body 20 is configured to cut the second portion 114 of T-slot groove 112 in a single pass without being guided by a pilot hole or guide hole pre-cut into the work piece 110. Moreover, the base wall 112E of the T-slot groove 112 cut by the router bit 1 is free from being sanded and/or cleaned by the woodworker subsequent to the T-slot groove 112 being cut into the work piece 110 since the first horizontal cutting edge 50H1 and the second horizontal cutting edge 50H2 of the tip portion 50 cut the base wall 112E. Such profile of the tip portion 50 thus saves the woodworker time in finishing the work piece 110 as well as being free from using or owning additional woodworking finishing tools.

During the cutting operation, pieces of cut work piece may also be evacuated or withdrawn from inside of the T-slot groove 112 in a single pass via the up-cut profile of the router bit 1. Particularly, the pair of base flutes 30E of base portion 30, the pair of reamer flutes 40E of reamer portion 40, and the pair of tip flutes 50E collectively funnel and withdrawn the pieces of cut work piece upwardly along the body 20 from the T-slot groove 112 to the top surface 110A of work piece 110 in a single pass.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A T-slot router bit, comprising:
a shank end;
a boring end opposite to the shank end;
a shank extending from the shank end and adapted to engage with a chuck of a router; and
a body extending from the shank to the boring end and defining a T-shaped configuration, the body comprising:
a base portion extending from the shank;
a reamer portion extending from the base portion and configured to cut a first portion of a T-slot groove; the reamer portion having a first end positioned proximate to the base portion, a second end opposite to the first end and positioned proximate to a tip portion, at least one chamfered cutting edge extending from the first end to at least one planar cutting edge that extends towards the tip portion, and at least one rounded cutting edge extending from the at least one planar cutting edge to the second end of the reamer portion; wherein the at least one chamfered cutting edge is configured to cut a pair of top chamfered walls defining the T-slot groove; and
the tip portion extending from the reamer portion to the boring end and configured to cut a second portion of the T-slot groove vertically below the first portion of the of the T-slot groove;
a pair of helical flutes of the body extending between the shank and the boring end; and
a pair of cutting edges extending between the shank and the boring end;
wherein the body is configured to simultaneously cut a T-slot groove into a work piece and withdraw pieces of cut work piece from the T-slot groove in a single pass.

2. The T-slot router bit of claim 1, wherein the tip portion comprises:
a first end positioned proximate to the reamer portion;
a second end positioned opposite to the first end at the boring end; and
at least one substantially vertical cutting edge extending longitudinally from the first end to the second end;
wherein the at least one substantially vertical cutting edge is configured to cut a pair of first vertical walls defining the T-slot groove in the work piece.

3. The T-slot router bit of claim 2, wherein the tip portion further comprises:
a pair of tip lands; and at least one helical tip flute defined between the pair of tip lands;

wherein the at least one helical tip flute defines a first portion of the at least one helical flute of the body.

4. The T-slot router bit of claim 3, wherein the tip portion further comprises:

a web; and at least one substantially horizontal cutting edge extending radially outward from the web to the at least one substantially vertical cutting edge;

wherein the at least one substantially horizontal cutting edge is configured to cut a base wall defining the T-slot groove in the work piece;

wherein the base wall is positioned vertically below the pair of first vertical walls.

5. The T-slot router bit of claim 4, wherein the tip portion further comprises:

a notch defined in the at least one horizontal cutting edge;

wherein the notch extends from the at least one vertical cutting edge towards the web.

6. The T-slot router bit of claim 4, wherein the tip portion further comprises:

at least one substantially horizontal trailing edge; and at least one flank extending between the at least one substantially horizontal cutting edge and the at least one substantially horizontal trailing edge;

wherein the at least one flank enables the pieces of cut work piece to flow from the at least one substantially horizontal cutting edge to the at least one substantially horizontal trailing edge.

7. The T-slot router bit of claim 4, further comprises:

wherein the at least one planar cutting edge is configured to cut a pair of second vertical walls defining the T-slot groove;

wherein the pair of second vertical walls is defined between the pair of top chamfered walls and the pair of first vertical walls.

8. The T-slot router bit of claim 7, wherein the reamer portion further comprises:

a pair of reamer lands; and at least one helical reamer flute defined between the pair of reamer lands;

wherein the at least one helical reamer flute defines a second portion of the at least one helical flute of the body.

9. The T-slot router bit of claim 8, wherein the reamer portion further comprises:

a first angle of the at least one chamfered cutting edge measured relative to a drill axis defined between the shank end and the boring end; and a second angle of the at least one planar cutting edge measured relative to the drill axis;

wherein the first angle is greater than the second angle when viewed from a front elevation view.

10. The T-slot router bit of claim 1, wherein the base portion comprises:

a pair of base lands; and at least one helical base flute defined between the pair of base lands;

wherein the at least one helical base flute defines a third portion of the at least one helical flute of the body.

11. The T-slot router bit of claim 1, further comprising:

a first bit length defined by the base portion;

a second bit length defined by the reamer portion; and a third bit length defined by the tip portion;

wherein the third bit length is less than each of the first bit length and the second bit length.

12. The T-slot router bit of claim 1, wherein the at least one helical flute of the body is oriented in an up-cut configuration.

13. The T-slot router bit of claim 1, wherein the at least one rounded cutting edge is configured to cut a pair of rounded walls below the pair of top chamfered walls and a pair of planar walls defining the T-slot groove.

14. A method of cutting a T-slot groove into a work piece in a single pass, comprising steps of:

engaging a shank of a T-slot router bit with a router;

introducing the T-slot router bit and the router to the work piece;

aligning a body of the T-slot router bit with a side wall of the work piece, wherein the body defines a T-shape configuration;

cutting a pair of top walls of the T-slot groove, via at least one chamfered cutting edge of a reamer portion of the body, in the single pass;

cutting a pair of first vertical walls of the T-slot groove, by at least one planar cutting edge of the reamer portion of the body, in the single pass; and cutting a pair of rounded walls of the T-slot groove, by at least one rounded cutting edge of the reamer portion of the body, in the single pass below the pair of top chamfered walls and the pair of first vertical walls;

wherein the pair of top walls is chamfered relative to a top surface of the work piece.

15. The method of claim 14, further comprising:

withdrawing pieces of cut work piece from the T-slot groove, via a pair of helical flutes defined in the body, in the single pass.

16. The method of claim 14, wherein the pair of first vertical walls are substantially perpendicular to the top surface of the work piece and vertically below the pair of top walls.

17. The method of claim 16, wherein the step of cutting the T-slot groove into the work piece further comprises:

cutting a pair of second vertical walls of the T-slot groove, via at least one substantially vertical cutting edge of a tip portion of the body, in the single pass;

wherein the pair of second vertical walls are substantially perpendicular to the top surface of the work piece and vertically below the pair of first vertical walls.

18. The method of claim 17, wherein the step of cutting the T-slot groove into the work piece further comprises:

cutting a base wall of the T-slot groove, via at least one substantially horizontal cutting edge of the tip portion of the body, in the single pass;

wherein the pair of base wall is substantially parallel to the top surface of the work piece and vertically below the pair of second vertical walls.

* * * * *